United States Patent [19]

Hagiwara

[11] Patent Number: 4,986,745
[45] Date of Patent: Jan. 22, 1991

[54] ROLLER HEAD OPENING AND CLOSING APPARATUS IN ROLLER HEAD EXTRUDER

[75] Inventor: Katsunobu Hagiwara, Kobe, Japan

[73] Assignee: Kabushiki Kaisha Kobe Seiko Sho, Kobe, Japan

[21] Appl. No.: 379,367

[22] Filed: Jul. 13, 1989

[30] Foreign Application Priority Data

Jan. 5, 1987 62-440

[51] Int. Cl.$^5$ .............................................. B29C 47/08
[52] U.S. Cl. ................................ 425/182; 425/192 R; 425/194; 425/327
[58] Field of Search ........... 425/182, 186, 190, 192 R, 425/193, 194, 327, 363, 380, 382.3, DIG. 116, DIG. 235

[56] References Cited

U.S. PATENT DOCUMENTS 3,359,597  12/1967  Bainton ..................... 425/DIG. 235
3,895,898   7/1975  Theysohn ............................ 425/363
4,127,373  11/1978  Anders et al. ....................... 425/380
4,354,814  10/1982  Grimminger et al. .... 425/DIG. 235
4,372,736   2/1983  Gooch et al. ........................ 425/149

Primary Examiner—Jay H. Woo
Assistant Examiner—James P. Mackey
Attorney, Agent, or Firm—Oblon, Spivak, McClelland, Maier & Neustadt

[57] ABSTRACT

A roller head opening and closing apparatus in a roller head extruder includes parallel upper and lower rollers disposed at an extrudate outlet end of the extruder and having axes extending orthogonal to the longitudinal axis of the extruder. Two frames are rotatably journaled at opposite ends of the rollers and can pivot about the axis of the lower roller. Actuators pivot the frames from a position in which the roller axes lie in the same vertical plane to a position in which the upper roller is swung away from the extrudate outlet so that a maintenance space is created between the extrudate outlet and the upper roller. This permits the use of a stationary electric motor for driving the lower roller, and so avoids the need for electrical contacts which compensate for motor movement.

7 Claims, 3 Drawing Sheets

FIG. IA
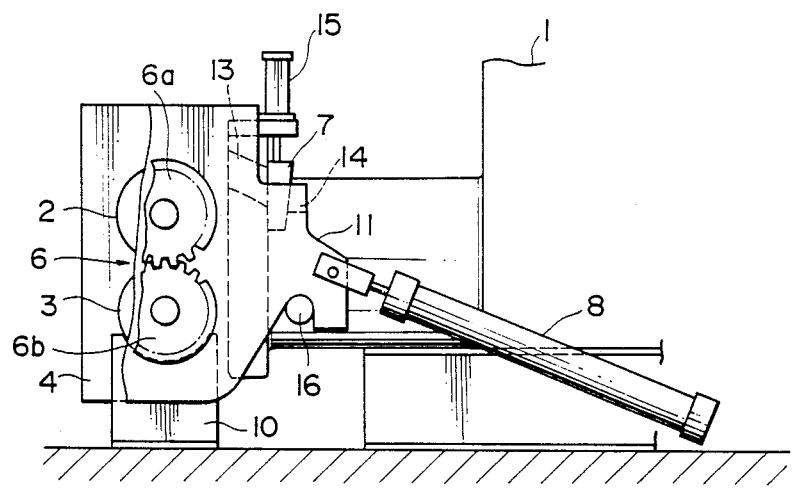
FIG. IB
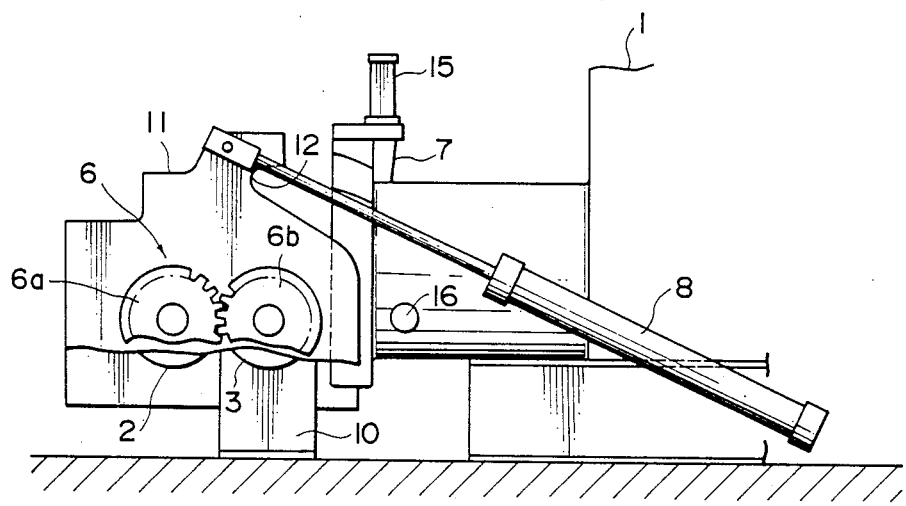

ROLLER HEAD OPENING AND CLOSING APPARATUS IN ROLLER HEAD EXTRUDER

BACKGROUND OF THE INVENTION

1. Field of the Invention

The present invention relates to a roller head opening and closing apparatus in a roller head extruder for extruding and pressing materials to be kneaded and mixed such as rubber and plastics.

22. Background of the Related Art

In a roller head extruder, for checking whether there remains rubber or plastics (hereinafter referred to as "residue"), cleaning the residue if any, and for maintenance and inspection of the extruder prior to change of the material in the interior of the extruder, it is necessary to form a maintenance space for at least the upper half of the worker's body between the outlet side of the extruder and a roller head (hereinafter referred to as a "head") which comprises frames, upper and lower rollers and power transmission means. In order to obtain such a space there has been proposed a roller head opening and closing apparatus in a roller head extruder wherein both the head and lower roller driving means ar retracted to the side opposite to the extruder. As an example, such a conventional roller head opening and closing apparatus will be explained below with reference to FIGS. 6 and 7.

In the conventional roller head extruder, a head 67 is provided on the extrudate outlet side of the extruder 51. The head 67 is composed of an upper roller 52 whose lower portion presses the upper surface of the extrudate and which is supported. A lower roller 53 is disposed below the upper roller 52, the lower roller 53 pressing at the upper portion thereof the lower surface of the extrudate and being supported. A pair of support frames 54 are erected to support the upper and lower rollers 52, 53 at both end portions of the rollers. Gears 56 mounted on shaft ends of the upper and lower rollers 52, 53 projecting to the exterior of the frames 54, the gears 56 being in mesh with each other. A cotter 57 is provided for locking and unlocking the frames 54 with respect to the outlet side of the extruder in a position wherein the longitudinal axes of the upper and lower rollers 52, 53 are vertically parallel to each other. An actuator is provided at 65. On the side of the roller 53 opposite to the side where the gear 56 is mounted there is disposed a drive unit 55 connected to the roller 53 through a rotary joint 59, the drive unit 55 comprising an electric motor for rotating the lower roller 53 and a reduction gear. The head 67 and the drive unit 55 are placed on the same movable bed 68, and for retracting the movable bed 68 to the side opposite to the extruder 51 there is provided an actuator 58, one end of which is pivotally connected to the movable bed. Further, below the movable bed 68 there are disposed a plurality of rails 69 which slidably support the movable bed 68.

In the roller head opening and closing apparatus of the above roller head extruder, after the material to be kneaded and mixed is extruded from the extruder 51 and pressed by the upper and lower rollers 52, 53 into a semi-finished product, if there occurs the necessity of changing the material to be kneaded and mixed and if at this time the material before the change remains in the interior of the extruder 51, the quality of the semi-finished product after the material change will be inferior, with a different material incorporated therein. In order to prevent the formation of such an inferior product it is necessary to check the interior of the extruder 51 and clean it if necessary to remove residual rubber or plastics (hereinafter referred to as "residue") before the change of the material to be extruded and pressed. To this end, the actuator 65 is operated to move the cotter 57 upwards to unlock the head 67 from the outlet side of the extruder 51, then the movable bed 68 is allowed to slide on the rails 69 by the operation of the actuator 58 and thereby be retracted to the side opposite to the extruder 51, whereby between the outlet side of the extruder 51 and the head 67 there is formed a space which permits a worker to enter for checking and cleaning the interior of the extruder 51. After the worker checks whether the residue is present in the interior of the extruder 51 and cleans out the residue if any, the movable bed 68 is moved to the outlet side of the extruder 51 by reverse operation of the actuator 58. Then, the cotter 57 is brought down by the actuator 65 whereby the head 67 is locked to the outlet side of the extruder 51. The roller head extruder is now ready to restart the operation of extrusion and pressing after the material change.

In the roller head opening and closing apparatus in the roller head extruder described above with reference to FIGS. 6 and 7, a space which permits a worker to enter is formed between the head 67 and the outlet side of the extruder 51 by retracting the movable bed 68 with the head 67 and the drive unit 55 mounted thereon to the side opposite to the extruder 51. Therefore, a dead space is needed which is not utilized at all during the operation of extrusion and pressing, and it is necessary provide components which are essential but low in degree of utilization, such aS the movable bed 68 and the rails 69.

Further, the electric wiring for supplying electric power to the drive unit 55 must be provided flexibly or in such a manner as to permit a sliding power supply. If the electric wiring is made flexible, it is bent every time the movable bed 68 is retracted, so that the electric wiring may be broken by a strain hardening phenomenon induced by repeated bending, or even if it is not broken, the coating thereof may come into repeated contact with another object, resulting in wear or short-circuiting of the coating. Thus, the reliability thereof is low.

Also, if the electric wiring is constructed for sliding power supply, the maintenance period is required to become shorter due to wear.

SUMMARY OF THE INVENTION

Accordingly, it is an object of the present invention to provide a roller head opening and closing apparatus in a roller head extruder capable of overcoming the above-mentioned problems, dispensing with dead space and components of low utilization degree such as the movable bed and rails, and having enhanced reliability for the electric wire.

The above and other objects are achieved according to the present invention by a roller head opening and closing apparatus in a roller head extruder, comprising parallel upper and lower rollers disposed at an extrudate outlet end of the extruder and having axes extending orthogonal to the longitudinal axis of the extruder. Two frames rotatably journal respective opposite ends of the rollers. Drive means rotate the lower roller, and the rotation of the lower roller is transmitted to the upper roller via power transmission means. Support means independent of the frames support the lower roller so that the frames may pivot about the axis of the lower roller. Swing means pivot the frames about the axis of the lower roller such that the upper roller is swung away from the extrudate outlet, whereby a maintenance space is created between the extrudate outlet and the upper roller. Lock means are provided for locking the frame at a pivotal position in which the roller axes lie in the same vertical plane.

According to a further feature of the invention, the power transmission means comprise meshing gears mounted to the ends of the rollers. According to a further feature of the invention, the drive means comprise a stationary electric motor connected to the lower roller via a reduction gear. According to a further feature of the invention, the swing means comprise actuators connected between the frames and the extruder. According to a further feature of the invention, the locking means comprise a cotter positionable at a locking position between each of the frames and a portion of the extrudate outlet. The cotters are driven by actuators.

Prior to change of the material of the extrudate extruded from the extruder, the lock mechanism which keeps the frames locked to the outlet side of the extruder is operated to unlock the frames. Then, by the operation of the swing means there is exerted a force for moving the frames pivotally about the longitudinal axis of the lower roller. With such swing motion of the frame, the upper roller is pivotally moved up to a front position beyond the lower roller located on the outlet side of the extruder while being allowed to rotate by the power transmission means. As a result, a maintenance space which permits checking of the interior of the extruder and cleaning of the residue is formed above the lower roller located on the outlet side of the extruder.

For locking the thus-pivoted frames to the outlet side of the extruder, the swing means is operated reversely. By reverse-operation of the swing means the frames are pivotally moved to the outlet side of the extruder about the longitudinal axis of the lower roller. When the longitudinal axis of the upper roller has been positioned just above the longitudinal axis of the lower roller, the operation of the swing means is stopped. Then, the lock mechanism is operated reversely whereby the frames are locked to the outlet side of the extruder.

Thus, the roller head extruder is now ready to perform the operation of extrusion and pressing after the material change.

BRIEF DESCRIPTION OF THE DRAWINGS

FIGS. 1A and 1B are side views showing a first embodiment of the present invention;

DETAILED DESCRIPTION OF THE PREFERRED EMBODIMENT

Embodiments of the present invention will be described hereinunder with reference to FIGS. 1 to 5.

First Embodiment

Figure 2:
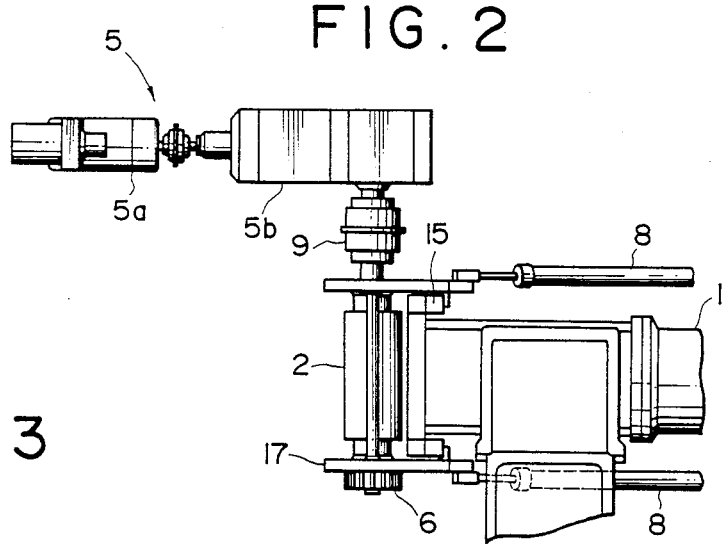
FIG. 2 is a top view showing the first embodiment of the present invention.
Figure 3:
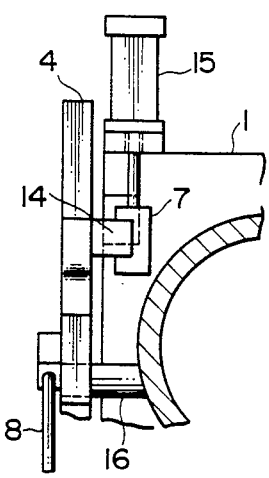
FIG. 3 is a partial sectional view showing a lock mechanism used in the first embodiment of the present invention.

A first embodiment will be described below with reference to FIGS. 1 and 2.

In FIG. 1, the numeral 1 denotes an extruder. On the outlet side of the extruder 1 there are erected a pair of frames 4 on both sides of the outlet-side end portions of the extruder 1 and in parallel with the longitudinal axis of the extruder. An upper roller 2 and a lower roller 3 are journal mounted to the frames 4 rotatably through shafts in positions between the frames so that the respective longitudinal axes are in the same vertical plane and perpendicular to the longitudinal axis of the extruder 1. Further, transmission means 6 comprised of gears 6a, 6b for transmitting the rotation of the lower roller 3 to the upper roller 2 are mounted on the end portions of the shafts of the rollers 2 and 3 which end portions are projecting to the outside of the associated frame 4, the gears 6a, 6b being in mesh with each other. A bendable rotary joint 9 is connected to the lower roller 3 on the side opposite to the side where the gear 6b is mounted, to transmit thereto the rotation of the drive means 5 which includes a stationary electric motor 5a and a reduction gear 5b. Below the lower roller 3 and inside the frames 4 there is erected a support member 10 having a concave surface formed in the upper portion thereof correspondingly to the circumference of the lower roller 3, with a gap being formed between the peripheral surface of the lower roller 3 and the concave surface. Near the center of each frame 4 there is formed a projecting portion 11 projecting towards the extruder 1, and a cutout 12 which opens downwards is formed in the lower part of the projecting portion 11. In the vicinity of each side of the lower portion on the outlet side of the extruder 1 there is provided a projecting shaft 16 whose axis in a longitudinal direction is parallel to the longitudinal axis of the lower roller 3, and the upper inner surface of each cutout 12 is brought into abutment with the upper outer peripheral surface of one projecting shaft 16. Further, the upper part of each projecting portion 11 is provided with a projecting piece 14 projecting toward the extruder 1, the projecting piece 14 being able to pass through a slot 13 formed in the vicinity of the upper portion on the outlet side of the extruder during the pivotal movement of each frame 4. The face of the projecting piece 14 on each extruder outlet side is formed so as to have an inclination which gradually approaches the outlet side of the extruder 1 from its upper to lower portion. And a cotter 7 having an inclined face corresponding to the inclined face of the projecting piece 14 is inserted into a locking position in the gap defined by the inclined face of each projecting piece 14 and the extruder end face on the side opposite to the outlet side of the extruder 1, each cotter 7 being movably supported vertically by an actuator 15 fixed to an upper part on the outlet side of the extruder 1. Further, for each frame there is provided a swing means comprised by an actuator 8, one end of which is pivotally connected to the projecting portion 11 on a portion close to the extruder 1.

The roller head opening and closing apparatus in the roller head extruder of the above construction operates in the following manner.

Each cotter 7 is raised by the actuator 15 and thereby removed from the ga formed between the projecting piece 14 and the end face on the side opposite to the outlet side of the extruder 1. Then, each actuator 8 is operated to move the projecting piece 14 toward the outlet side of the extruder 1, whereby each frame 4 is slightly lowered due to rotation centering on the longitudinal axis of the projecting shaft 16 and the lower surface of the lower roller 3 comes into abutment with the concave surface of the lower support member 10. As a result, the cutout 12 of each frame 4 is disengaged from its projecting shaft 16. The projecting piece 14 of each frame 4 passes through the slot 13 formed in the vicinity of the upper portion on the outlet side of the extruder 1 and each frame 4 is pivotally moved to the side opposite the extruder 1 about the longitudinal axis of the lower roller 3. During the pivotal movement of each frame 4, the upper roller 2 is continued to be driven by the gear 6a. In this way the upper roller 2 is pivotally moved beyond the lower roller 3 to the side opposite to the extruder 1 until the upper surfaces of the upper and lower rollers 2, 3, reach the same height, whereupon the operation of the actuator 8 is stopped. Consequently, on the outlet side of the extruder 1 there is formed a space above the upper surface of the lower roller 3 which space permits checking the interior of the extruder 1, cleaning out the residue remaining in the interior, as well as inspection and servicing.

When such checking, cleaning, etc. of the interior of the extruder 1 is over, each frame 4 is pivotally moved toward the outlet side of the extruder about the longitudinal axis of the lower roller 3 by reverse-operation of its actuator 8, while driving the upper roller 2. Each projecting piece 14 passes through the slot 13, the cutout 12 of the frame comes into engagement with the projecting shaft 16, and the upper inner surface of the cutout 12 abuts the upper surface of the projecting shaft 16. Consequently, each frame 4 swings about the longitudinal axis of the projecting shaft 16 and the lower surface of the lower roller 3 leaves the concave surface of the support member 10. Then, when each frame 4 reaches the position in which the longitudinal axes of the upper and lower rollers 2, 3 are vertically parallel to each other, the reverse-operation of its actuator 8 is stopped, while the cotter 7 is moved down by the actuator 15 and inserted in the gap formed by the end face on the side opposite to the outlet side of the extruder 1 and the inclined face of the projecting piece 14. In this way the head, indicated at 17, is locked on the outlet side of the extruder 1 and now ready perform the next step of extrusion and pressing operation after the material change.

Second Embodiment

Figure 4:
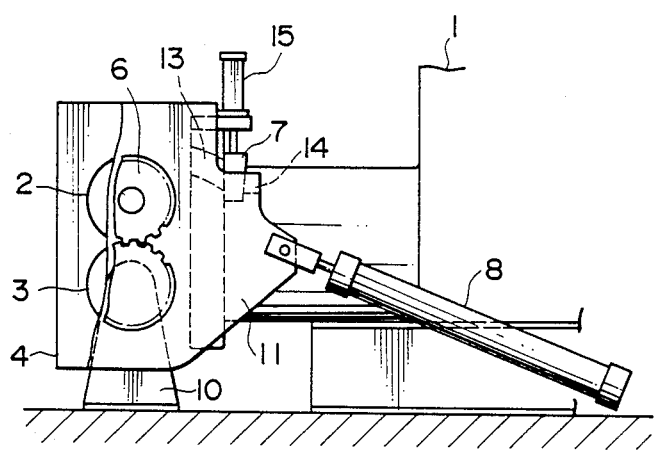
FIGS. 4 and 5 are a side view and a front view both showing a second embodiment of the present invention.
Figure 5:
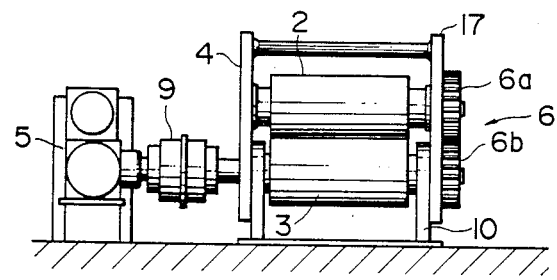
Figure 6:
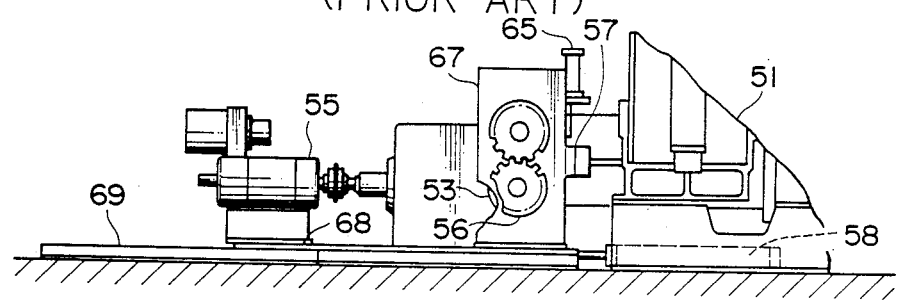
FIG. 6 is a side view of a conventional roller head opening and closing apparatus.
Figure 7:
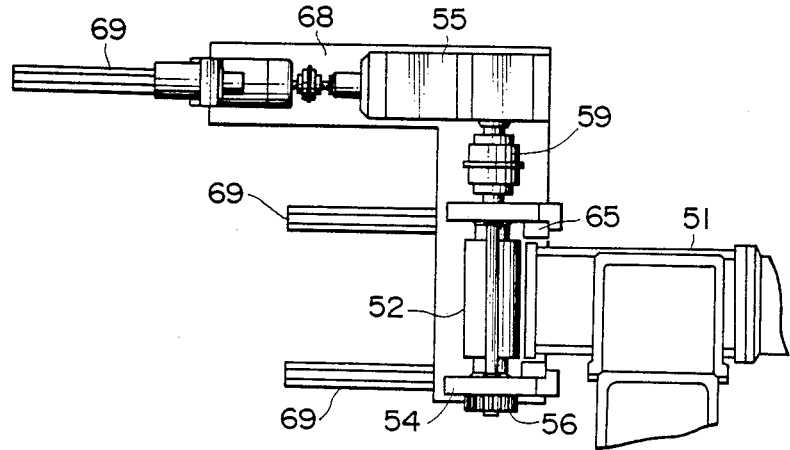
FIG. 7 is a top view of the conventional roller head opening and closing apparatus.

In FIGS. 4 and 5, the numeral 1 denotes an extruder. On the outlet side of the extruder 1 there are erected a pair of frames 4 in parallel with the longitudinal axis of the extruder 1, with the extruder outlet side put therebetween. Between, the frames 4 there are journal mounted an upper roller 2 and a lower roller 3 rotatably through shafts so that the respective longitudinal axes are in the same vertical plane to each other and orthogonal to the longitudinal axis of the extruder 1. Further, transmission means 6 comprised of gears 6a, 6b for transmitting the rotation of the lower roller 3 to the upper roller 2 are mounted on the one end portions of the shafts of the rollers 2 and 3 which end portions are projecting to the outside of the associated frame 4, the gears 6a, 6b being in mesh with each other. A rotary joint 9 is connected to the lower roller 3 on the side opposite to the side where the gear 6a is mounted, to transmit thereto the rotation of drive means 5 including an electric motor through a reduction gear. Further, a support member 10 which supports the lower roller 3 is rotatably erected inside the frames 4. Near the center of each frame 4 there is formed a projecting portion 11 projecting towards the extruder 1. The upper part of each projecting portion 11 is provided with a projecting piece 14 projecting toward the extruder 1, the projecting piece 14 being able to pass through a slot 13 formed in the vicinity of the upper portion on the outlet side of the extruder during the pivotal movement of each frame 4. The face of each projecting piece 14 on the extruder outlet side is formed so as to have an inclination which gradually approaches the outlet side of the extruder 1 from its upper to lower portion. And a cotter 7 having an inclined face corresponding to the inclined face of the projecting piece 14 is inserted into a locking position in the gap defined by the inclined face of each projecting piece 14 and the extruder end face on the side opposite to the outlet side of the extruder 1, each cotter 7 being movably supported vertically by an actuator 15 fixed to n upper part on the extruder outlet side. Further, for each frame 4 there is provided an actuator 8, one end of which is pivotally connected to the projecting portion 11 in a position below the projecting piece 14.

The roller head opening and closing apparatus of this embodiment operates in the following manner. Each cotter 7 is raised by its actuator 15 and thereby removed from the gap formed between the inclined face of the projecting piece 14 and the end face on the side opposite to the outlet side of the extruder 1. And by means of its actuator 8 each frame 4 is moved to the side opposite to the extruder 1 pivotally about the longitudinal axis of the lower roller 3 while the upper roller 2 is driven by the gear 6a. When the upper surfaces of the upper and lower rollers 2, 3 reach the same height, the operation of the actuator 8 is stopped. On the outlet side of the extruder 1 there is now formed a space above the upper surface of the lower roller 3 which space permits checking the interior of the extruder 1, cleaning out the residue remaining in the interior, as well as inspection and servicing.

When such checking, cleaning, etc. for the interior of the extruder 1 is over, each frame 4 is pivotally moved toward the outlet side of the extruder about the longitudinal axis of the lower roller 3 by reverse-operation of its actuator 8, while driving the upper roller 2. Further, each projecting piece 14 passes through the slot 13, and when each frame 4 reaches the position in which the longitudinal axes of the upper and lower rollers 2, 3 are vertically parallel to each other, the reverse-operation of its actuator 8 is stopped, while the cotter 7 is moved down by the actuator 15 and inserted into the gap formed between the end face on the side opposite to the outlet side of the extruder 1 and the inclined face of the projecting piece 14, whereby each frame 4 is locked to the outlet side of the extruder 1.

Although in the above embodiments the actuator 8 was adopted as swing means for each frame 4, the pivotal movement of the frame 4 may be affected by a mechanical means using a link or rack.

Although in the above embodiments two cotters 7 were provided at the upper portion on the outlet side of the extruder 1 for locking and unlocking the frames 4, they may be mounted on the frame 4 side, or there may be used only one such cotter.

Further, although in the above embodiments the gears 6a, 6b were used for transmitting the rotation of the lower roller 3 to the upper roller 2, they may be replaced by the combination of a sprocket and chain.

In the roller head opening and closing apparatus according to the present invention, by the operation of the actuators 8 the frames 4 are pivotally moved to the side opposite to the extruder 1 about the longitudinal axis of the lower roller 3 and the upper roller 2 is pivotally moved to the same side beyond the lower roller 3 to form a space on the outlet side of the extruder 1 which space permits checking the interior of the extruder 1, removal of the residue if any, as well as inspection and servicing. Therefore, the space for movement of the drive means 5 is no longer necessary.

Moreover, it is no longer necessary to provide a movable bed and rails for carrying the head and the drive means 5 thereon which have heretofore been necessary for the movement of the head and the drive means 5, the head comprising the frames 4, upper and lower rollers 2, 3 and power transmission means 6.

Further, since the drive means 5 can be mounted in a fixed position, the electric wiring for driving the drive means 5 can be fixed, so it will not undergo repeated bending nor will it be worn out by sliding, thus permitting the reliability thereof to be enhanced easily. As a result, it is possible to prolong its maintenance period.

Consequently, it is possible to realize a roller head opening and closing apparatus in a roller head extruder which dispenses with dead space and a movable bed, etc. with low utilization degree and which has enhanced reliability of the electric wiring.

What is claimed is:

1. A roller head opening and closing apparatus in a roller head extruder, comprising:

parallel upper and lower rollers disposed at an extrudate outlet end of the extruder and having axes extending orthogonal to the longitudinal axis of the extruder;
   two frames which rotatably journal respective opposite ends of said rollers;
   drive means for rotating said lower roller;
   power transmission means for transmitting a rotation of said lower roller to said upper roller;
   support means independent of said frames for supporting said lower roller, whereby said frames may pivot about the axis of said lower roller;
   lock means for locking said frames at a pivotal position in which the roller axes lie in a single same vertical plane; and
   swing means for pivoting said frames about the axis of said lower roller such that said upper roller is swung away from the extrudate outlet, whereby a maintenance space is created between the extrudate outlet and said upper roller.

2. The apparatus of claim 1, wherein said power transmission means comprises meshing gears mounted to ends of said rollers.

3. The apparatus of claim 1, wherein said drive means comprise a stationary motor.

4. The apparatus of claim 1, wherein said swing means comprises actuators connected between said frames and said extruder.

5. The apparatus of claim 1, wherein said lock means comprise a cotter positionable at a locking position between each of said frames and a portion of said extrudate outlet.

6. The apparatus of claim 5, wherein said lock means further comprise an actuator for driving each cotter into said locking position.

7. The apparatus of claim 3 wherein said stationary motor comprises an electric motor connected to said lower roller via a reduction gear.

* * * * *

UNITED STATES PATENT AND TRADEMARK OFFICE
CERTIFICATE OF CORRECTION

PATENT NO. : 4,986,745

DATED : January 22, 1991

INVENTOR(S) : Katsunobu Hagiwara

It is certified that error appears in the above-identified patent and that said Letters Patent is hereby corrected as shown below:

On the title page please delete the following:

--[30] FOREIGN APPLICATION PRIORITY DATA

Jan. 5, 1987    62-440 --.

Signed and Sealed this

Eighth Day of September, 1992

Attest:

DOUGLAS B. COMER

*Attesting Officer*      *Acting Commissioner of Patents and Trademarks*